A. MOTRONI.
BOTTLE STOPPER.
APPLICATION FILED FEB. 6, 1914.

1,127,912.

Patented Feb. 9, 1915.

WITNESSES
F. D. Swift.
A. L. Kitchin

INVENTOR
Alfred Motroni
BY
ATTORNEYS

UNITED STATES PATENT OFFICE.

ALFRED MOTRONI, OF NEW YORK, N. Y.

BOTTLE-STOPPER.

1,127,912. Specification of Letters Patent. Patented Feb. 9, 1915.

Application filed February 6, 1914. Serial No. 816,924.

*To all whom it may concern:*

Be it known that I, ALFRED MOTRONI, a subject of the King of Italy, and a resident of the city of New York, borough of Manhattan, county and State of New York, have invented a new and Improved Bottle-Stopper, of which the following is a full, clear, and exact description.

This invention relates to improvements in bottle stoppers, and has for an object to provide an improved structure which is adapted to maintain a bottle closed except during the time that fluid is being discharged therefrom.

Another object of the invention is to provide a stopper for bottles formed with a resilient member for automatically pinching or gripping the neck of the bottle so as to hold the stopper in place, such resilient member being designed to operate in connection with bottles having necks of different sizes.

In carrying out the object of the invention the cap or stopper may be made of any desired material, and is designed especially for milk bottles though it could be made in sizes for any kind of bottles desired. In construction a stopper embodying the invention a cap structure is provided which is designed to overlap the top or neck of the bottle so as to afford a good gripping surface. Connected with the top is a tubular member having a resilient strip wrapped around the same for pressing against the interior surface of the neck of the bottle and thereby providing a retaining member. The tubular member has radiating therefrom a vent member and a discharge spout. The discharge spout is provided with a pivotally mounted lid formed with a resilient stopper for limiting the opening movement of the lid, whereby whenever the stopper is in an upright position the lid will automatically move under gravity to a closed position.

Figure 1:
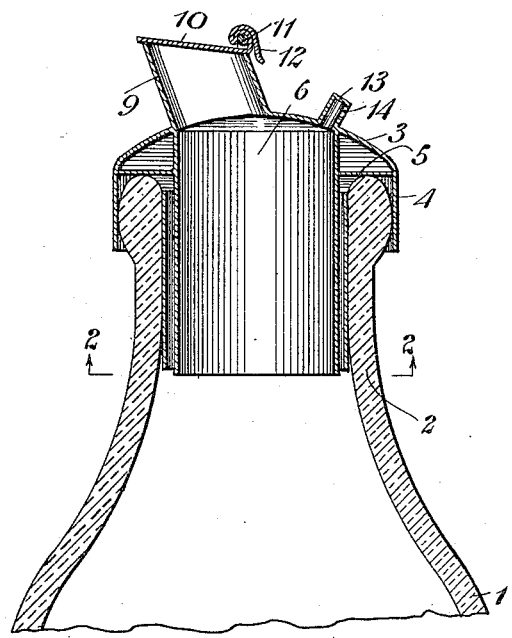
Figure 2:
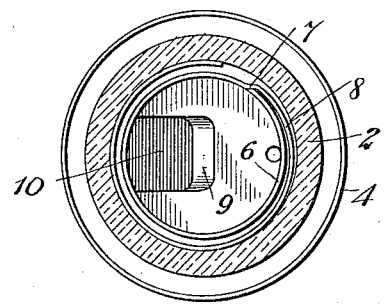

In the accompanying drawings—Figure 1 is a longitudinal vertical section through the upper part of a bottle and a stopper embodying the invention; Fig. 2 is a section through Fig. 1 on line 2—2.

Referring to the accompanying drawings by numeral 1 indicates a bottle of any desired kind, as for instance a milk bottle, which is provided with the usual form of neck 2. A stopper embodying the invention is associated with neck 2 and comprises a covering member 3 formed with a downwardly extending flange 4 which presents a gripping surface on applying and removing the stopper. A partitioning member 5 is provided within cap 3 which limits the downward movement of the entire stopper, and which has connected therewith a tubular discharge member 6, which is also connected in any desired manner, as for instance by being soldered to the cover 3. The tubular member is preferably made from a single loop of metal which is preferably soldered at point 7 (Fig. 2) and the remaining part of the metal expanded so as to present a loop or loose winding 8. Member 8 is of resilient material and tends to continually flare outwardly and thus press against the side walls of neck 1 so as to hold the stopper against accidental removal. By providing the resilient member 8 the stopper may be used in connection with bottles having different sized necks.

Connected with the cover 3 and communicating with the upper part of tubular member 6 is a discharge spout 9 provided with a lid 10 pivotally journaled on a rod 11. The lid 10 is preferably formed with an extension 12 bent over for acting as a hinge in connection with rod 11, and also for acting as a resilient stopper for the lid 10, whereby the lid 10 can be opened only to a limited extent while discharging fluid from bottle 1. It is of course evident that it will be necessary to tilt or invert bottle 1 to a greater or less extent in order that the fluid may flow therefrom. When bottle 1 is inverted or partially inverted the lid 10 will open by gravity assisted by the flowing of the the fluid from the bottle, and when bottle 1 is again set upright the lid 10 will be automatically closed under the action of gravity, whereby the bottle will be maintained in a closed position except during the discharge of fluid therefrom. In order that air may enter bottle 1 to take the place of the fluid removed therefrom a projection 13 is provided formed with a tower 14 for admitting air into tubular member 6.

What I claim is—

In a stopper of the class described, a covering member adapted to overlap the neck of a bottle, a tubular member connected with said covering member adapted to project into the neck of a bottle, a spring loop connected with said tubular member and partially surrounding the same, said spring loop being adapted to press against the interior walls of the neck of the bottle, and a discharge member communicating with said tubular member.

In testimony whereof I have signed my name to this specification in the presence of two subscribing witnesses.

ALFRED MOTRONI.

Witnesses:
 JOSEPH JACOBS,
 MICHAEL J. SMITH.

Copies of this patent may be obtained for five cents each, by addressing the "Commissioner of Patents, Washington, D. C."